United States Patent
Kraschienski et al.

(10) Patent No.: US 9,561,700 B2
(45) Date of Patent: Feb. 7, 2017

(54) CONNECTING ARRANGEMENT BETWEEN A WHEEL-GUIDING LINK OF A VEHICLE WHEEL SUSPENSION AND A FLANGE

(71) Applicant: Bayerische Motoren Werke Aktiengesellschaft, Munich (DE)

(72) Inventors: Olaf Kraschienski, Munich (DE); Ralph Eppelein, Neufahrn (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/830,139

(22) Filed: Aug. 19, 2015

(65) Prior Publication Data

US 2015/0352919 A1 Dec. 10, 2015

Related U.S. Application Data

(63) Continuation of application No. PCT/EP2014/050922, filed on Jan. 17, 2014.

(30) Foreign Application Priority Data

Feb. 20, 2013 (DE) .......................... 10 2013 202 791

(51) Int. Cl.
 *B60G 7/02* (2006.01)
(52) U.S. Cl.
 CPC ........................................ *B60G 7/02* (2013.01)
(58) Field of Classification Search
 CPC ........................................................ B60G 7/02
 See application file for complete search history.

(56) References Cited

U.S. PATENT DOCUMENTS 2,585,914 A * 2/1952 Carlton ..................... B60S 1/68
15/256.51

FOREIGN PATENT DOCUMENTS

| DE | 10 2004 015 048 A1 | 10/2005 | |
|----|--------------------|---------|---|
| DE | 10 2011 007 621 A1 | 10/2012 | |
| EP | 1 312 535 A2 | 5/2003 | |
| FR | 2652312 A1 * | 3/1991 | ............... B60G 3/06 |

OTHER PUBLICATIONS

International Search Report (PCT/ISA/210) dated May 9, 2014 with English-language translation (four (4) pages).
Chinese Office Action issued in counterpart Chinese Application No. 201480005315.3 dated May 18, 2016 with English translation (nine pages).

* cited by examiner

*Primary Examiner* — Faye M Fleming
(74) *Attorney, Agent, or Firm* — Crowell & Moring LLP

(57) ABSTRACT

A connecting arrangement between a wheel-guiding link of a vehicle wheel suspension and a flange of a carrier or similar uses a bolt, which bolt passes through a longitudinal hole in the carrier flange or the link. A cutting structure is provided that separates the wall of the longitudinal hole if a sufficiently strong tensile or compressive force is exerted against the wall, thereby enabling the connecting arrangement to be undone. The cutting structure may be provided on the bolt, on a nut screwed thereon, on a disc between the flange or the link and the nut or the head of the bolt, or may be held in the longitudinal hole on a wall section.

11 Claims, 4 Drawing Sheets

CONNECTING ARRANGEMENT BETWEEN A WHEEL-GUIDING LINK OF A VEHICLE WHEEL SUSPENSION AND A FLANGE

CROSS REFERENCE TO RELATED APPLICATIONS

This application is a continuation of PCT International Application No. PCT/EP2014/050922, filed Jan. 17, 2014, which claims priority under 35 U.S.C. §119 from German Patent Application No. 10 2013 202 791.5, filed Feb. 20, 2013, the entire disclosures of which are herein expressly incorporated by reference.

BACKGROUND AND SUMMARY OF THE INVENTION

The invention relates to a connecting arrangement between a wheel-guiding link of a vehicle wheel suspension and a flange of a carrier or the like wherein a bolt passes through a slot in the carrier flange or in the link. For prior art, reference is made to DE 10 2011 007 621 A1 and DE 10 2004 015 048 A1.

By way of such an arrangement, it is possible for wheel-guiding links to be connected to an axle carrier or a wheel carrier, both of which are generally referred to herein as a "carrier", wherein the bolt is usually formed by a screw onto which is mounted a nut that clamps the link and the carrier with respect to one another. It is customary for a suitably designed rubber bearing or articulation to be provided or arranged in such a connecting arrangement. In the case of a construction comparable to the aforementioned DE 10 2004 015 048 A1 with an interposed bearing holder, the bearing holder will be assigned in the terminology of the present invention to the "link" or the "carrier" depending on the detailed configuration.

For safety reasons, it may be desired for such a connecting arrangement to be released, in particular in the event of a vehicle crash, but also, where appropriate, during the occurrence of abnormal forces caused in some other way, which is generally designated as "external force-based" in the present case. For this purpose, the object of the present invention is to provide another advantageous design.

This and other objects are achieved for a connecting arrangement between a wheel-guiding link of a vehicle wheel suspension and a flange of a carrier or the like, wherein a bolt passes through a slot in the carrier flange or in the link, by providing a cutter structure which, during the occurrence of a sufficiently high tensile or compressive force directed against the wall of the slot, severs the wall and thus allows the connecting arrangement to be released.

According to the invention, a cutter or the like, here referred to as "cutter structure", for severing or breaking open the wall of the slot receiving the bolt is provided. The cutter structure becomes effective when a correspondingly high force acts and, during the occurrence of said force, the connecting arrangement should be released. This force acts first of all on the cutter and from there on the wall or a portion thereof on which the cutter impinges such that the cutter at least damages the wall to such an extent that, with further action of force in a direction at least partially perpendicular to the bolt longitudinal axis, the bolt slides, as it were, laterally out of the slot. Thereupon, the link is separated as desired from the carrier. Here, the force may be a compressive force acting on the bolt at least partially perpendicular to its longitudinal axis or a tensile force which acts on the link or on the carrier and which causes at least a slight displacement of these two elements with respect to one another in such a way that the suitably provided cutter or cutter structure can act in the manner described.

Here, a cutter structure according to the invention is distinguished by minimal structural outlay and, in any case when the cutter structure is provided within the slot, by a negligibly low overall space requirement. A cutter or a cutter structure here is intended to mean a cutting edge or the like which has a certain hardness and is therefore capable, when impinging on an object which has a lesser hardness than it, at least of damaging it in the impinging region. When applied to the range of action of a cutter structure according to the invention on a connecting arrangement of the type discussed above, the wall of the slot should at least be damaged, preferably even broken open, by an external force-based impingement of the cutter structure (under the effect of a certain minimum force) to such an extent that the bolt can pass through the damaged point, whereupon this connecting arrangement is released as desired.

The cutter structure can be provided on the mounted bolt itself. In this case, it substantially lies within the slot. Alternatively, a suitable cutter or cutter structure can be provided on a screw nut screwed onto the bolt or on a disk between the flange or the link and said screw nut or on a screw head of the bolt. The cutter structure preferably extends in each case in a suitable manner into the slot in such a way that, after at least a slight external force-based displacement, the cutter structure can impinge on a wall portion of this slot. Here, an anti-rotation device on the element bearing the cutter structure (for example, on an aforementioned disk) can ensure that, in the mounted state, the cutter is oriented in the desired direction. The latter is not required if the cutter structure is held or supported in the slot itself on a wall portion surrounding it, for example via a narrow web which breaks during a corresponding external force-based displacement of the link or carrier. In such a case, the bolt impinges on the cutter structure and subsequently presses it there against the wall of the slot, where this wall is intended to be broken open.

In order to promote the breaking-open of the wall surrounding the slot in the case of an external force-based impingement of the cutter, it is possible to provide in this wall a suitable predetermined breaking point, which is designed to break open or break through the wall portion loaded by the impinging cutter structure. For example, such a predetermined breaking point can be embodied in the form of a local weakening of the wall portion or of a slit provided therein; however, it is also possible for the portion, which is to be broken open under corresponding external force action, of the wall surrounding the slot to be provided in a plane adjacent to the other wall region of the slot, with the result that a step, as it were, is formed in the wall surrounding the slot. Moreover, such a step or a step formed in some other way can also be provided in the relatively narrow or relatively wide bearing region of a screw head of the bolt or of a screw nut screwed thereon and of the wall of the carrier flange or link. This is referred to as a slide step which supports an at least slight displacement of the cutter structure during the occurrence of a sufficiently high tensile or compressive force in that at least a reduced clamping force if any acts on the bolt after the external force-based coverage of a slight distance. This emerges particularly clearly from the first of the exemplary embodiments explained hereinbelow.

Other objects, advantages and novel features of the present invention will become apparent from the following

BRIEF DESCRIPTION OF THE DRAWINGS

FIG. 3a shows a third embodiment in a view analogous to FIG. 1a;

FIG. 4 shows a fourth embodiment in a view analogous to FIG. 1a;

DETAILED DESCRIPTION OF THE DRAWINGS

Figure 1A:
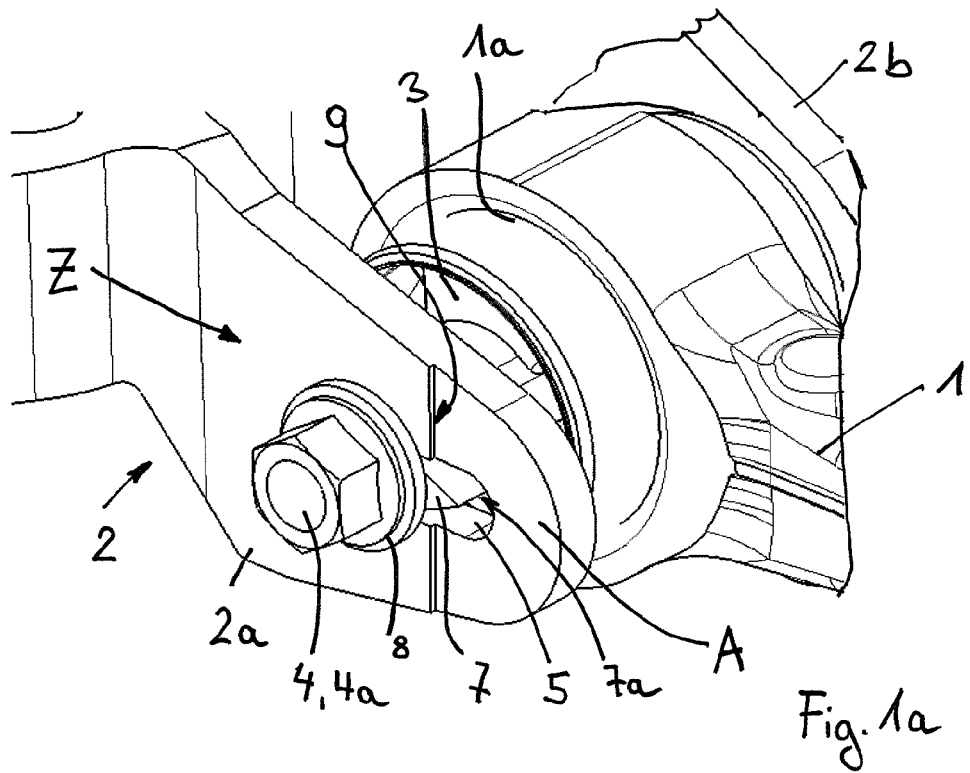
FIG. 1a shows a first embodiment in a three-dimensional representation (with a view from outside)

In the figures, identical elements are always designated by the same reference signs. Thus, a wheel-guiding link in the wheel suspension of an, in particular, two track vehicle bears the reference sign 1 (FIG. 1a of the first exemplary embodiment) and a carrier or a carrier flange on which the link 1 is fastened so as to be at least slightly pivotable via a connecting arrangement bears the reference sign 2. Here, the pivotability is represented by a rubber bearing 3 or the like, which in the present case is inserted in a bearing eye 1a of the link 1 and is traversed in a customary way in principle by a bolt screw 4 which produces a single shear or double shear connection between the link 1 and the carrier 2. Accordingly, the link eye 1a can be arranged to lie between two bearing lugs 2a, 2b of the carrier/carrier flange 2 and thus the link 1 can be fastened to the carrier 2. Alternatively, it is possible for the link 1 to be fastened to the carrier or carrier flange 2 with its link eye 1a bearing against only one such bearing lug or the carrier flange 2. This fastening is represented by a bolt screw 4 which is guided through slots 5 in the bearing lugs 2a, 2b, wherein the bolt screw 4 bears with its screw head 4a on the outer side of one bearing lug 2a, and, bearing oppositely on the outer side of the other bearing lug 2b, a screw nut (not shown) is screwed onto the bolt screw 4. In the case of a single shear attachment, of course only one slot 5 is present and it should be pointed out that, in the case of a double shear attachment, it is in no way necessary for the two slots in the two bearing lugs 2a, 2b to be identically dimensioned.

Within the slot 5 visible here in the bearing lug 2a, there can be seen a cutter structure 7. The cutter structure 7 is formed on a disk 8 which lies between the screw head 4a and the outer side of the bearing lug 2a and through which the bolt screw 4 is guided. Here, the actual cutter 7a of this cutter structure 7, which functions as a cutting edge and here also takes the form of an edge, is directed toward the right side or front "end side" of the slot 5 in FIG. 1a, i.e. is aligned with that portion A of the wall of the carrier flange 2 surrounding the slot 5 that is furthest away from the longitudinal axis of the bolt screw 4. Here, the slot 5 and thus also the cutter structure 7 are oriented such that the longer half axis of the slot 5 extends in the direction of a possible tensile force Z which acts between the link 1 and the carrier 2 in the event of an impact of the vehicle with an obstacle (="crash"). This tensile force Z can run substantially in the longitudinal direction of the link 1 and thus act in the present case perpendicular to the axis of the bolt 4 with a substantially horizontally oriented bearing lug 2a (or horizontal slot 5) substantially in the horizontal direction such that the bolt 4 with the cutter structure 7 is displaced toward the wall portion A.

Figure 3A:
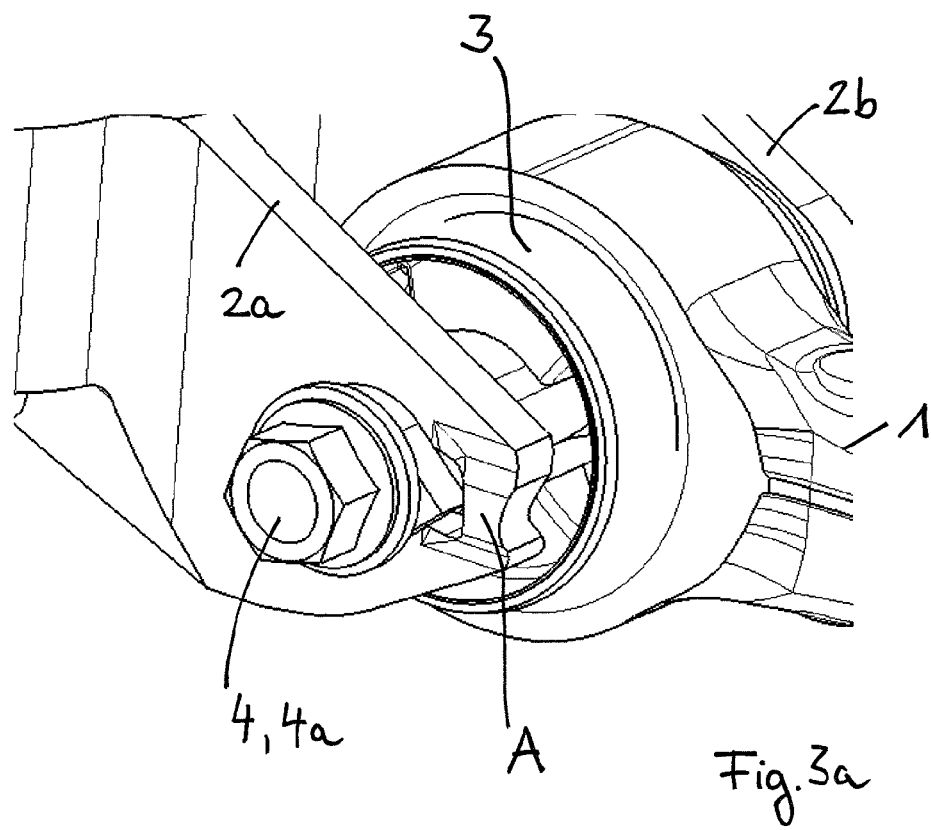

If, in the event of an impact of the vehicle with an obstacle, a high tensile force Z acts as an external force on the link 1 such that, consequently, the link 1 including the bolt 4 and the disk 8 with the cutter structure 7 is displaced slightly in the direction of the tensile force Z with respect to the bearing lugs 2a, 2b, the cutter structure 7 finally impacts the wall surrounding the slot 5 in the right end region in FIGS. 1a, 3a, 4a (=portion A). The cutter structure 7, thus either breaks the wall open or damages it at least to such an extent that, with a slight further external force based displacement of the link 1 according to arrow direction Z, the bolt 4 can be "freed" from the slot 5 and thus from the bearing lug or the bearing lugs 2a, 2b, whereby the connecting arrangement shown is released. This is desired in order to avoid a displacement of the wheel that is guided by the link 1 in an undesired direction, this displacement being caused by the impact with an obstacle ("crash").

FIG. 1a shows a further feature, namely that a slide step 9 is provided on and in the wall of the carrier flange 2 in the here further bearing region of the screw head 4a of the bolt. The slide step 9 becomes effective only after a slight displacement of the bolt 4 in arrow direction Z, and facilitates a further displacement of the cutter structure 7 during the occurrence of a sufficiently high tensile or compressive force in that at least a reduced clamping force, if any, acts on the bolt 4 after the external force causes the bolt to move a small distance to reach the slide step 9. Such a slide step 9 is represented here by a smaller thickness of the wall of the carrier flange 2 or of the bearing lug 2a (and/or 2b) thereof measured in the direction of the longitudinal axis of the bolt 4.

Figure 1B:
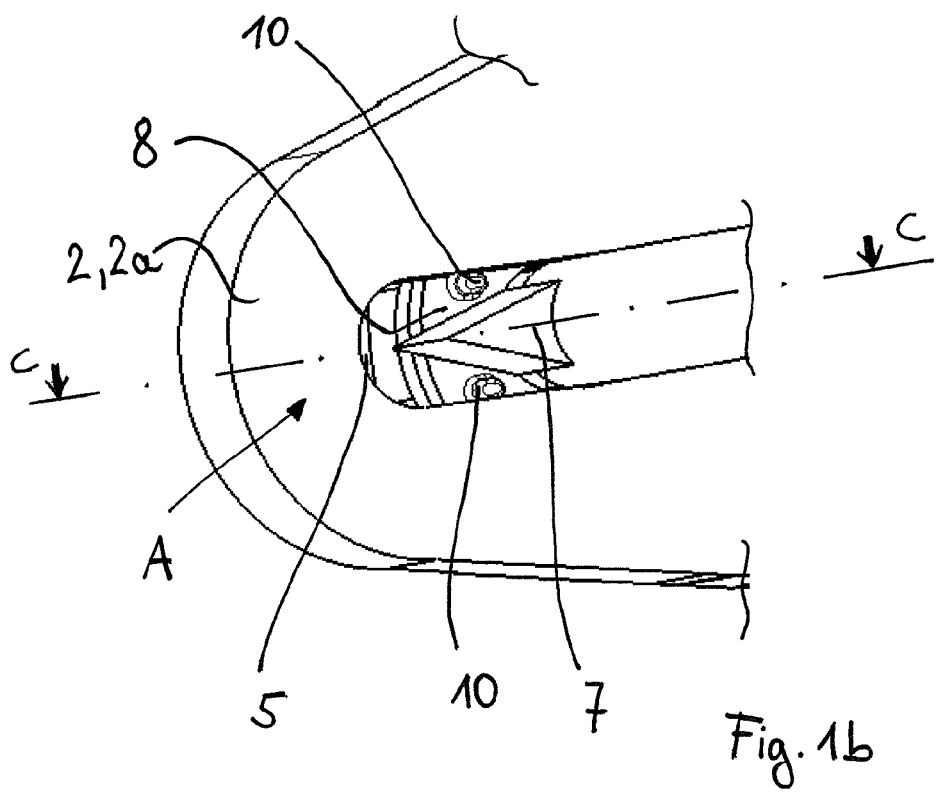
FIG. 1b shows this first embodiment in a view from inside.
Figure 1C:
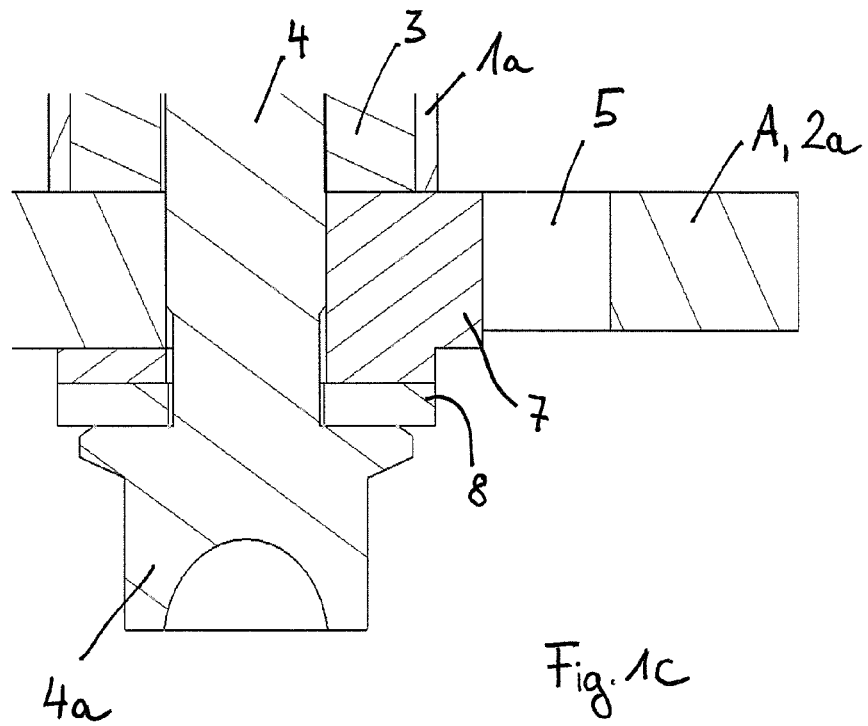
FIG. 1c shows the section C-C from FIG. 1b.

FIG. 1b is a view from an inner side, i.e. viewed from the link 1. FIG. 1b shows the cutter structure 7 lying within the slot 5 in the carrier flange 2, including slot 5, and further shows two anti-rotation devices 10 provided on the aforementioned disk 8 on which the cutter structure 7 is suspended as it were. The anti-rotation devices project into the slot 5 at its side edges and prevent the cutter structure 7 from being rotated in an undesired direction or being oriented in an undesired direction when tightening the bolt 4, i.e. when assembling the connecting arrangement. Furthermore, the profile of the section C-C represented in FIG. 1c can be discerned from FIG. 1b.

Figure 2:
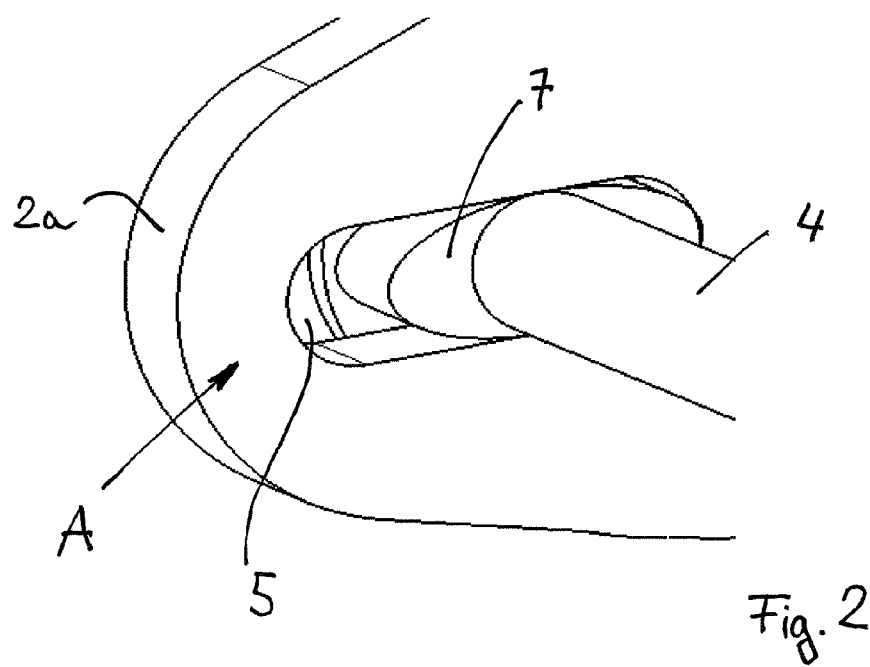
FIG. 2 shows a second embodiment in a view analogous to FIG. 1b.

As shown by the second exemplary embodiment in FIG. 2 in a view analogous to the exemplary embodiment represented in FIG. 1b, the cutter structure 7 does not have to have a cutter (reference sign 7a in FIG. 1b) tapering to a point (in the form of an edge), but can also be formed elliptically in the region of the cutter 7a. Furthermore, in this exemplary embodiment, the cutter structure 7 is a constituent part of the correspondingly designed bolt 4, i.e. the cutter structure 7 is formed at a suitable point on the shaft of the bolt 4.

Figure 3B:
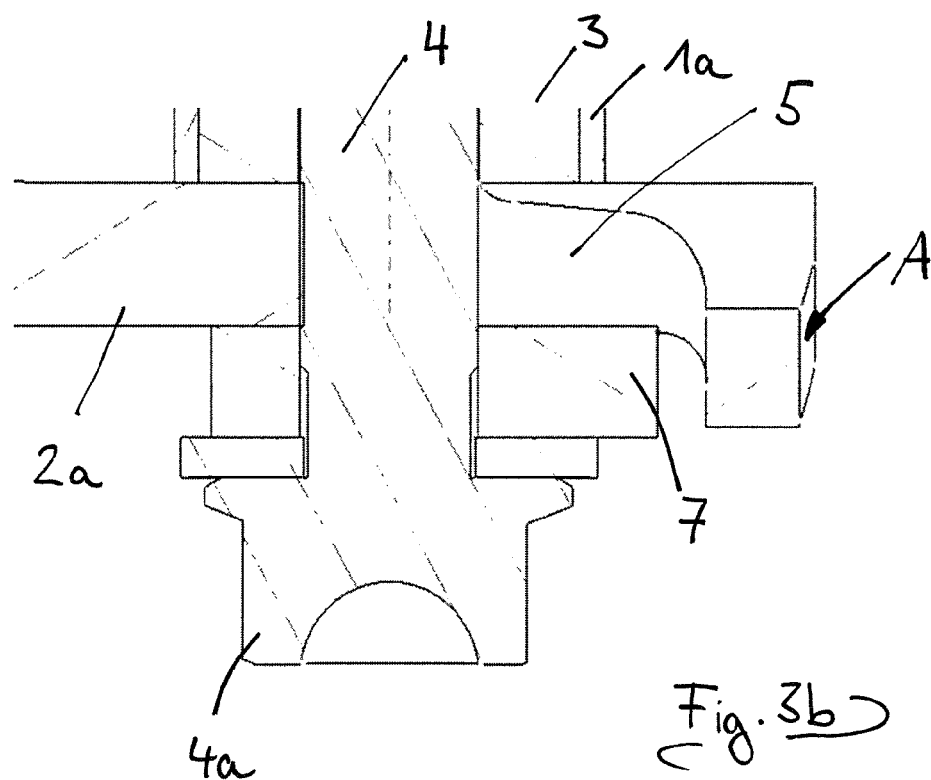
FIG. 3b shows the third embodiment in a section analogous to FIG. 1c.

In the exemplary embodiment according to FIGS. 3a, 3b, a predetermined breaking point is provided in the portion A of the wall surrounding the slot 5 that is to be broken open by the cutter structure 7 under the external force action. This wall portion A lies in a plane adjacent to the other wall region of the slot 5 (cf. in particular FIG. 3b), with the result that (again) a step is formed, as it were, in the wall surrounding the slot 5. With such a structure or a similar structure, it is more simply possible for a desired breaking open to be achieved after even a slight displacement of the screw bolt 4 or of carrier flange 2 and link 1 relative to one another.

Figure 4:
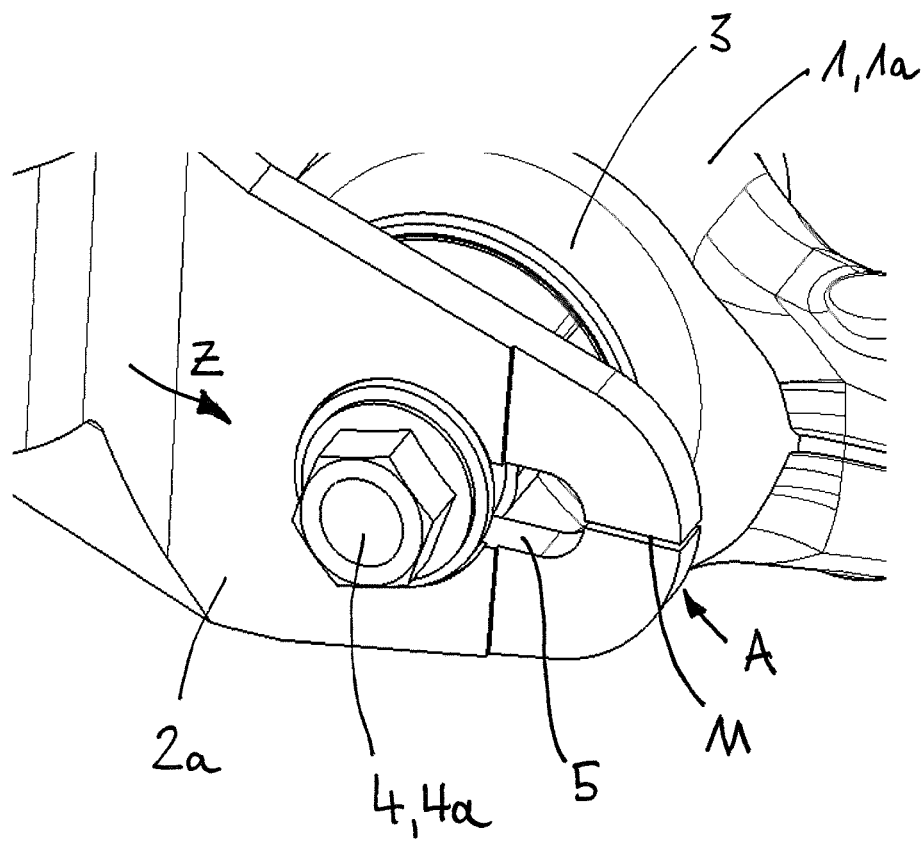

Finally, the exemplary embodiment of FIG. 4 also shows a "prepared" predetermined breaking point in the wall portion A, which is to be broken open by the cutter structure 7 based on an external force. Here, the designed breaking point is in the form of a local weakening of the wall portion A, which weakening is embodied here in the form of a slit 11 which is provided in this wall portion A. The slit extends substantially in the direction of the tensile force Z (=external force). Here, the cutter structure 7 is not visible in this illustration. Owing to the predetermined breaking point (=slit 11), the cutter structure 7 may be designed to be substantially smaller and is therefore concealed by the screw head 4a, or, owing to the slit 11, the shaft of the screw bolt 4 itself acts as cutter structure 7 and therefore no specially designed cutter structure 7 need be provided.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A connecting arrangement in a vehicle, comprising:
   a wheel-guiding link of a vehicle wheel suspension;
   a flange of a carrier, wherein the flange or the link includes a slot;
   a bolt configured to pass through the slot in the flange or the link; and
   a cutter structure configured to impact a wall of the slot during an occurrence of a sufficiently high tensile or compressive force directed against the wall of the slot, whereby the connecting arrangement is releasable.

2. The connecting arrangement according to claim 1, wherein the cutter structure is provided on one of:
   a) the bolt;
   b) a nut screwed on the bolt;
   c) a disc arranged between the flange or the link and the nut or a head of the bolt, or
   d) a wall portion of the slot.

3. The connecting arrangement according to claim 2, wherein a predetermined breaking point is provided in the wall of the slot, the predetermined breaking point facilitating the release of the connecting arrangement upon the cutter structure impinging upon the wall of the slot.

4. The connecting arrangement according to claim 1, wherein a predetermined breaking point is provided in the wall of the slot, the predetermined breaking point facilitating the release of the connecting arrangement upon the cutter structure impinging upon the wall of the slot.

5. The connecting arrangement according to claim 3, wherein
   a slide step is provided on the flange of the link,
   the slide step is configured to facilitate a displacement of the cutter structure during the occurrence of the sufficiently high tensile or compressive force, and
   the slide step is arranged in a region between the bolt and the wall of the slot.

6. The connecting arrangement according to claim 1, wherein
   a slide step is provided on the flange of the link,
   the slide step is configured to facilitate a displacement of the cutter structure during the occurrence of the sufficiently high tensile or compressive force, and
   the slide step is arranged in a region between the bolt and the wall of the slot.

7. The connecting arrangement according to claim 3, wherein the predetermined breaking point is a slit extending in a longitudinal direction of the tensile or compressive force.

8. The connecting arrangement according to claim 3, wherein the predetermined breaking point is a weakened section of the wall of the slot that is impacted by the cutter structure.

9. The connecting arrangement according to claim 5, wherein the slide step is formed as a dimensionally reduced portion of the area surrounding the slot in the flange or the link.

10. The connecting arrangement according to claim 1, wherein the cutter structure comprises a wedge, a pointed edge of the wedge being oriented toward the wall of the slot along the longitudinal direction of the tensile or compressive force.

11. The connecting arrangement according to claim 1, wherein the cutter structure comprises:
    a disc arranged between the flange or the link and a nut or a head of the bolt;
    a cutter arranged on one side of the disc so as to be oriented within a width of the slot, the cutter being a wedge having a pointed end oriented toward the wall of the slot along a longitudinal direction of the tensile or compressive force; and
    one or more anti-rotation devices arranged on the side of the disc, the anti-rotation devices being configured to limit a rotational displacement of the cutter away from the longitudinal axis.

* * * * *